(12) United States Patent
Li et al.

(10) Patent No.: US 12,045,279 B2
(45) Date of Patent: Jul. 23, 2024

(54) METHOD AND SYSTEM OF CONTENT RETRIEVAL FOR VISUAL DATA

(71) Applicant: Microsoft Technology Licensing, LLC, Redmond, WA (US)

(72) Inventors: Ji Li, San Jose, CA (US); Adit Krishnan, Mountain View, CA (US); Amit Srivastava, San Jose, CA (US); Han Hu, Beijing (CN); Qi Dai, Beijing (CN); Yixuan Wei, Beijing (CN); Yue Cao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 17/538,880

(22) Filed: Nov. 30, 2021

(65) Prior Publication Data

US 2023/0169110 A1 Jun. 1, 2023

(51) Int. Cl.
  *G06F 16/58* (2019.01)
  *G06F 16/51* (2019.01)
  *G06F 16/56* (2019.01)
  *G06N 20/00* (2019.01)

(52) U.S. Cl.
  CPC .......... *G06F 16/5866* (2019.01); *G06F 16/51* (2019.01); *G06F 16/56* (2019.01); *G06N 20/00* (2019.01)

(58) Field of Classification Search
  CPC ...... G06F 16/5866; G06F 16/51; G06F 16/56; G06N 20/00
  See application file for complete search history.

(56) References Cited

U.S. PATENT DOCUMENTS

| | | | |
|---|---|---|---|
| 8,250,613 B2 * | 8/2012 | Faulkner | G06F 16/58 707/765 |
| 10,782,456 B2 * | 9/2020 | Schürmann | G02B 1/14 |
| 11,003,856 B2 * | 5/2021 | Kiros | G06F 40/289 |

(Continued)

FOREIGN PATENT DOCUMENTS

| | | | |
|---|---|---|---|
| WO | WO2020051249 | * | 3/2020 |
| WO | WO20200512249 | * | 3/2020 |

OTHER PUBLICATIONS

Chi et al., Zero-Shot Cross-Media Embedding Learning With Dual Adversarial Distribution Network; IEEE 2019.*

(Continued)

*Primary Examiner* — Daniel A Kuddus
(74) *Attorney, Agent, or Firm* — NovoTechIP International PLLC

(57) ABSTRACT

A system and method and for retrieving one or more visual assets includes receiving a search query for the one or more visual assets, the search query including textual data, encoding the textual data into one or more text embedding representations via a trained text representation machine-learning (ML) model, transmitting the one or more text embedding representations to a matching and selection unit, providing visual embedding representations of one or more visual assets to the matching and selection unit, comparing, by the matching and selection unit, the one or more text embedding representations to the visual embedding representations to identify one or more visual asset search results, and providing the one or more visual asset search results for display.

12 Claims, 9 Drawing Sheets

(56) References Cited

U.S. PATENT DOCUMENTS

| | | | |
|---|---|---|---|
| 11,533,495 B2* | 12/2022 | Jain | G06N 3/045 |
| 2005/0257240 A1* | 11/2005 | Faulkner | G06F 16/587 |
| | | | 725/135 |
| 2011/0047226 A1* | 2/2011 | Gabriel | H04L 51/063 |
| | | | 707/E17.069 |
| 2011/0307425 A1* | 12/2011 | Wang | G06F 16/9038 |
| | | | 707/E17.084 |
| 2013/0166543 A1 | 6/2013 | MacDonald et al. | |
| 2013/0166587 A1* | 6/2013 | Berry | G06F 16/71 |
| | | | 707/769 |
| 2015/0034357 A1* | 2/2015 | Dower | H01R 13/5205 |
| | | | 174/92 |
| 2015/0067541 A1* | 3/2015 | Owens | H04L 65/403 |
| | | | 715/753 |
| 2016/0042050 A1* | 2/2016 | Chen | G06F 8/61 |
| | | | 707/740 |
| 2016/0092447 A1* | 3/2016 | Venkataraman | G06F 16/735 |
| | | | 707/765 |
| 2017/0006357 A1* | 1/2017 | Obara | H04N 21/84 |
| 2017/0098283 A1 | 4/2017 | Rajan et al. | |
| 2017/0337265 A1 | 11/2017 | Garrett et al. | |
| 2019/0007755 A1* | 1/2019 | Obara | H04N 21/2353 |
| 2019/0065492 A1* | 2/2019 | Cheng | G06F 16/435 |
| 2019/0102397 A1 | 4/2019 | Hornkvist | |
| 2019/0163766 A1 | 5/2019 | Gulati | |
| 2019/0258713 A1* | 8/2019 | Kiros | G06F 40/20 |
| 2019/0258722 A1 | 8/2019 | Guo et al. | |
| 2019/0303402 A1* | 10/2019 | Berry | G06F 16/489 |
| 2019/0347556 A1 | 11/2019 | Yim et al. | |
| 2020/0413154 A1* | 12/2020 | Obara | H04N 21/84 |
| 2021/0191925 A1* | 6/2021 | Sianez | G06N 20/00 |
| 2022/0075961 A1 | 3/2022 | Cavallari | |
| 2022/0138170 A1 | 5/2022 | Misiewicz | |
| 2022/0245706 A1 | 8/2022 | Chaidaroon et al. | |
| 2023/0244727 A1 | 8/2023 | Liu | |
| 2023/0306087 A1 | 9/2023 | Krishnan et al. | |
| 2023/0325391 A1 | 10/2023 | Li et al. | |

OTHER PUBLICATIONS

Hassan, et al., "Multi-Modal Information Integration for Document Retrieval", In Proceedings of 12th International Conference on Document Analysis and Recognition, Aug. 25, 2013, pp. 1200-1204.

"International Search Report and Written Opinion Issued in PCT Application No. PCT/US23/010536", Mailed Date: Apr. 26, 2023, 10 Pages.

Chi, et al., "Zero-Shot Cross-Media Embedding Learning With Dual Adversarial Distribution Network", In Journal of IEEE Transactions on Circuits and Systems for Video Technology, vol. 30, Issue 4, Apr. 3, 2020, pp. 1173-1187.

Lin, et al., "Learning Cross-Aligned Latent Embeddings for Zero-Shot Cross-Modal Retrieval", In Proceedings of the AAAI Conference on Artificial Intelligence, vol. 34, Issue 7, Feb. 7, 2020, pp. 11515-11522.

"International Search Report and Written Opinion Issued in PCT Application No. PCT/US23/011566", Mailed Date: May 25, 2023, 10 Pages.

U.S. Appl. No. 18/158,121, filed Jan. 23, 2023.

"Non Final Office Action Issued in U.S. Appl. No. 17/716,653", Mailed Date: Jul. 14, 2023, 21 Pages.

U.S. Appl. No. 17/703,552, filed Mar. 24, 2022.

U.S. Appl. No. 17/716,653, filed Apr. 8, 2022.

Final Office Action mailed on Jan. 8, 2024, in U.S. Appl. No. 17/716,653, 28 pages.

Non-Final Office Action mailed on May 21, 2024, in U.S. Appl. No. 17/716,653, 38 pages.

\* cited by examiner

METHOD AND SYSTEM OF CONTENT RETRIEVAL FOR VISUAL DATA

BACKGROUND

In today's computer environments, users can often search for content for a variety of reasons. When the content searched for includes text or a textual description, a search can be conducted quickly and efficiently. However, many types of visual content do not include text and/or do not have a textual description associated with them. Searching for such content is often more complex. Locating and retrieving a desired visual content, however, can be an important aspect of some applications. For example, text-to-content recommendation services may be used to suggest images, icons, or emoticons based on text received as an input in an application.

To provide text-to-content recommendation services, some applications utilize one or more machine-learning (ML) models to search for the desired content and offer various recommendations to users. For example, a text-to-content recommendation service utilizes one or more text-to-content ML models trained to provide content recommendations for text. Training such models, however, is often difficult, as the number of content available for recommendations can be large and new content may be added on a regular basis. Moreover, there are often restrictions on use of user-collected data for training such ML models. Furthermore, because of the large number of available content, manually annotating a data set may become too expensive. Still further, the resulting trained ML models may become too large to deploy and operate. For example, such trained ML models may require significant memory space to store and operate.

Hence, there is a need for improved systems and methods of locating and retrieving visual content.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a search query for one or more visual assets, the search query including textual data, encoding the textual data into one or more text embedding representations via a trained text representation ML model, transmitting the one or more text embedding representations to a matching and selection unit, providing visual embedding representations of one or more visual assets to the matching and selection unit, comparing, by the matching and selection unit, the one or more text embedding representations to the visual embedding representations to identify one or more visual asset search results, and providing the one or more visual asset search results for display.

In yet another general aspect, the instant disclosure presents a method for retrieving one or more visual assets. In some implementations, the method includes receiving a search query for the one or more visual assets, the search query including textual data, encoding the textual data into one or more text embedding representations via a trained text representation ML model, transmitting the one or more text embedding representations to a matching and selection unit, providing visual embedding representations of one or more visual assets to the matching and selection unit, comparing, by the matching and selection unit, the one or more text embedding representations to the visual embedding representations to identify one or more visual asset search results, and providing the one or more visual asset search results for display.

In a further general aspect, the instant application describes a non-transitory computer readable medium on which are stored instructions that when executed cause a programmable device to perform function of receiving a search query for one or more visual assets, the search query including textual data, encoding the textual data into one or more text embedding representations via a trained text representation machine-learning (ML) model, transmitting the one or more text embedding representations to a matching and selection unit, providing visual embedding representations of one or more visual assets to the matching and selection unit, comparing, by the matching and selection unit, the one or more text embedding representations to the visual embedding representations to identify one or more visual asset search results, and providing the one or more visual asset search results for display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 3A-3B depict an example GUI screens of an application or service that provides visual content retrieval capabilities.

DETAILED DESCRIPTION

Figure 1A:
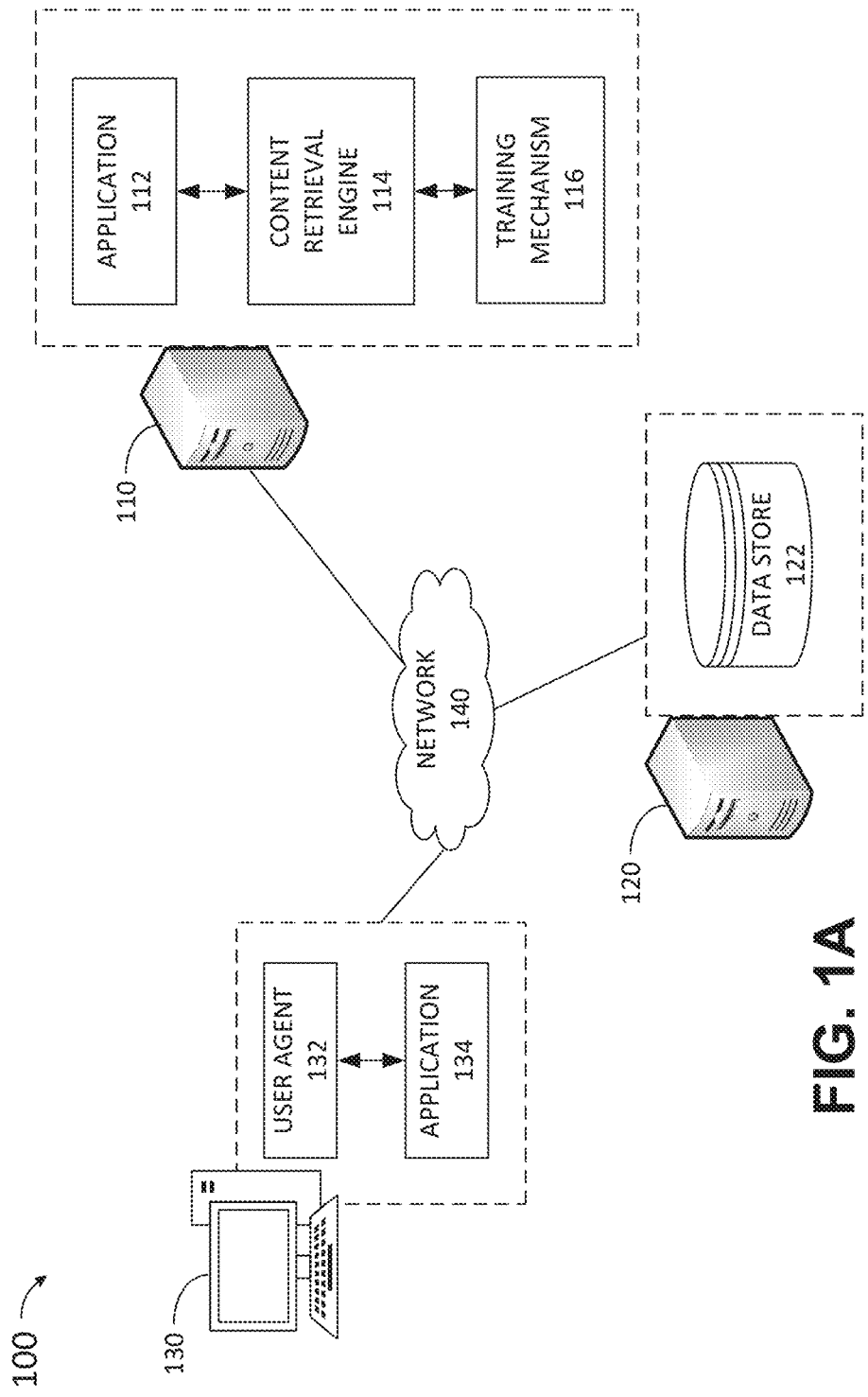
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many currently used software applications enable users to search for content and/offer content recommendations to users in order to assist the users create a document and/or improve the quality of a document they are working on. To make the document more aesthetically pleasing or interesting, the user may choose to add visual content to the document. For example, some documents such as flyers, invitations and the like may be developed by using many different visual elements. There are many different types of visual content that can be added to a document. For example, visual content may include images, videos, Graphical Interchange Formats (GIFs), icons, emoticons, vector graphics, and illustrations. The different types of visual content are often stored in databases that contain thousands or millions of visual files. As a result, locating and retrieving a desired visual content often requires conducting a search of these large.

Searching for visual content, however, is a complex process, as many visual files do not contain textual content or textual descriptions. The process of searching for visual content is made further complicated because of the many different types of visual content available. To address this issue, currently available mechanisms for searching visual content often include separate search systems for each type of visual content. These systems do not share the underlying technology and hence cannot benefit from improvements in each other. Furthermore, the use of separate search systems often leads to the need for additional memory, processing and bandwidth. Still further, because different search models are used for different type of visual content, some of the search models may underperform comparing to others, leading to a non-uniform user experience and user dissatisfaction. Thus, there exists a technical problem of lack of adequate mechanisms for conducting a search of different types of visual content using a cohesive or single searching system that provides a uniform searching experience.

New content (e.g., images, icons, emoticon, videos, etc.) is often being regularly added to the visual content databases. Currently used models for searching visual content often require that new content be labeled before it can be added to the visual content databases for searching. This requires significant cost and labor. Moreover, after new visual contents are added, because of lack of user feedback for the new content, the models often struggle to recommend them as search results. Thus, there exists another technical problem of lack of mechanisms for efficiently adding new visual content to visual content databases and providing the new content search results.

Moreover, most currently used visual content search models leverage past user data. Because user data may change over time, these models often need to be updated frequently. This requires significant cost, time, and computing resources. As such, there exists another technical problem of significant time and resources required to frequently update visual searching models.

To address these technical problems and more, in an example, this description provides technical solutions for intelligently retrieving visual assets from one or more visual asset libraries. This may be achieved by utilizing a content retrieval engine that includes a vision module, a text module and a matching and selection logic. The separate vision module, text module and matching and selection logic collectively process textual inputs received, access visual asset libraries and retrieve visual assets that correspond with the textual input. The vision module may include an asset index that is generated by applying a visual asset representation model that processes and transforms visual assets stored in one or more visual asset libraries to vector embeddings. The visual module may be trained to process and convert multiple type of visual assets. The textual module may also be trained to convert the textual input to a vector embedding. The text and visual vectors may then be compared by the matching and selection logic to locate one or more visual assets that correspond to the textual input. The use of the separate vision module provides a mechanism for adding new assets to visual asset libraries in a zero-shot manner that does not require labeling and can be performed quickly and efficiently. Searching via the content retrieval engine may be provided by one or more applications that provide explicit text search and/or implicit text analysis to perform a search of visual content. The searching features may be provided via a user interface (UI) screen that enables the user to perform a search and view search results and/or provides visual asset recommendations for inserting into a document. In this manner, the technical solution provides a searching and retrieval system for visual assets that can search for different types of assets, provides an efficient mechanism for adding new assets, is user friendly and provides highly accurate results.

As will be understood by persons of skill in the art upon reading this disclosure, benefits and advantages provided by such implementations can include, but are not limited to, a technical solution to the technical problems of lack of mechanisms for efficient and user-friendly searching of visual assets. Technical solutions and implementations provided herein offer a mechanism for vectorizing different types of visual assets once using a visual representation model, and then searching the vectorized visual assets when a textual search input is received. The benefits made available by these technology-based solutions provide a user-friendly mechanism for searching for visual assets, reduced memory, processing and bandwidth requirements for storing and running the searching systems and reduced costs associated with updating the visual asset libraries and search models.

As used herein, the terms "visual content," or "visual asset" may refer to an electronic file that provides a visual representation of an object. Types of visual assets include images, videos, GIFs, icons, emoticons, vector graphics, illustrations and the like. Furthermore, as used herein, the term "textual input" may refer to an input received via an input/output device of a computer device, where the input includes alphanumeric text or other characters. The term "document" may refer to an electronic file that includes content such as text (e.g., alphabets, numbers, symbols), emoticons, still images, video, audio, GIFs, icons, emoticons, vector graphics, illustrations and the like.

FIG. 1A illustrates an example system 100, upon which aspects of this disclosure may be implemented. The system 100 may include a server 110, which may itself include an application 112, a content retrieval engine 114 and a training mechanism 116. While shown as one server, the server 110 may represent a plurality of servers that work together to deliver the functions and services provided by each engine or application included in the server 110. The server 110 may operate as a shared resource server located at an enterprise accessible by various computer client devices such as a client device 130. The server 110 may also operate as a cloud-based server for offering content retrieval services in one or more applications such as application 112 and/or application 134.

The server 110 may include and/or execute a content retrieval engine 114, which may receive a request for visual content from an application such as the application 112 or 134 and may process the request by identifying one or more visual assets that correspond with the request. The request may be an explicit search request submitted by a user via a UI associated with the application 112 or 134. Alternatively, the request may be transmitted automatically via the application 112 or 134 to provide automatic content recommendations to the user. For example, the application 112 or 134 may examine the content of a document a user is interaction with, determine based on the actions of the user and/or other parameters that the user is creating content, identify keywords, formatting and/or other features of the content, and create a search query for visual content based on some of the content of the document and/or contextual data. This may be done by utilizing one or more ML models that perform NLP and/or other functions to automatically create one or more search queries for a document and/or user. The search query may include textual input such as text keywords.

The content retrieval engine 114 may include separate modules for processing the textual input and processing visual assets contained in one or more visual asset libraries. Furthermore, the content retrieval engine 114 may include a separate element for comparing the processed textual input with the processed visual assets to identify one or more visual assets that correspond with the textual input. One or more modules and elements of the content retrieval engine 114 may include one or more ML models. The internal structure of and data flow between the various elements of the content retrieval engine 114 is discussed in greater detail with respect to FIG. 1B.

One or more ML models implemented by the content retrieval engine 114 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training may be performed in an offline stage. Additionally, and/or alternatively, the one or more ML models may be trained using batch learning.

As a general matter, the methods and systems described herein may include, or otherwise make use of one or more ML model to perform natural language processing (NPL), vectorize visual assets and textual data and/or analyze content. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in visual assets, determine associations between various words and visual objects, and identify keywords and/or classify content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 may include a server 120 which may be connected to or include the data store 122 which may function as a repository in which databases relating to training models and/or visual asset data may be stored. Although shown as a single data store, the data store 122 may be representative of multiple storage devices and data stores which may be accessible by one or more of the content retrieval engine 114, training mechanism 1116, and application 112.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail with respect to FIGS. 5 and 6.

The client device 130 may include a local application 134. The application 134 may be a computer program executed on the client device that configures the device to be responsive to user input to allow a user to interactively create, edit, and/or review a document. The application 134 may also enable the user to interactively submit a search query and receive search results and/or content recommendations. Examples of suitable applications include, but are not limited to, a word processing application, a presentation application, a note taking application, and communications application, and a design application.

In some examples, the application used to submit a search query and/or receive content recommendations is executed on the server 110 (e.g., application 112) and provided via an online service. In some implementations, web applications communicate via the network 140 with a user agent 132, such as a browser, executing on the client device 130. The user agent 132 may provide a user interface that allows the user to interact with the application 112. User data from the application 134 or application 112 may be provided via the network 140 to the content retrieval engine 114 for use in providing visual asset search results.

Figure 1B:
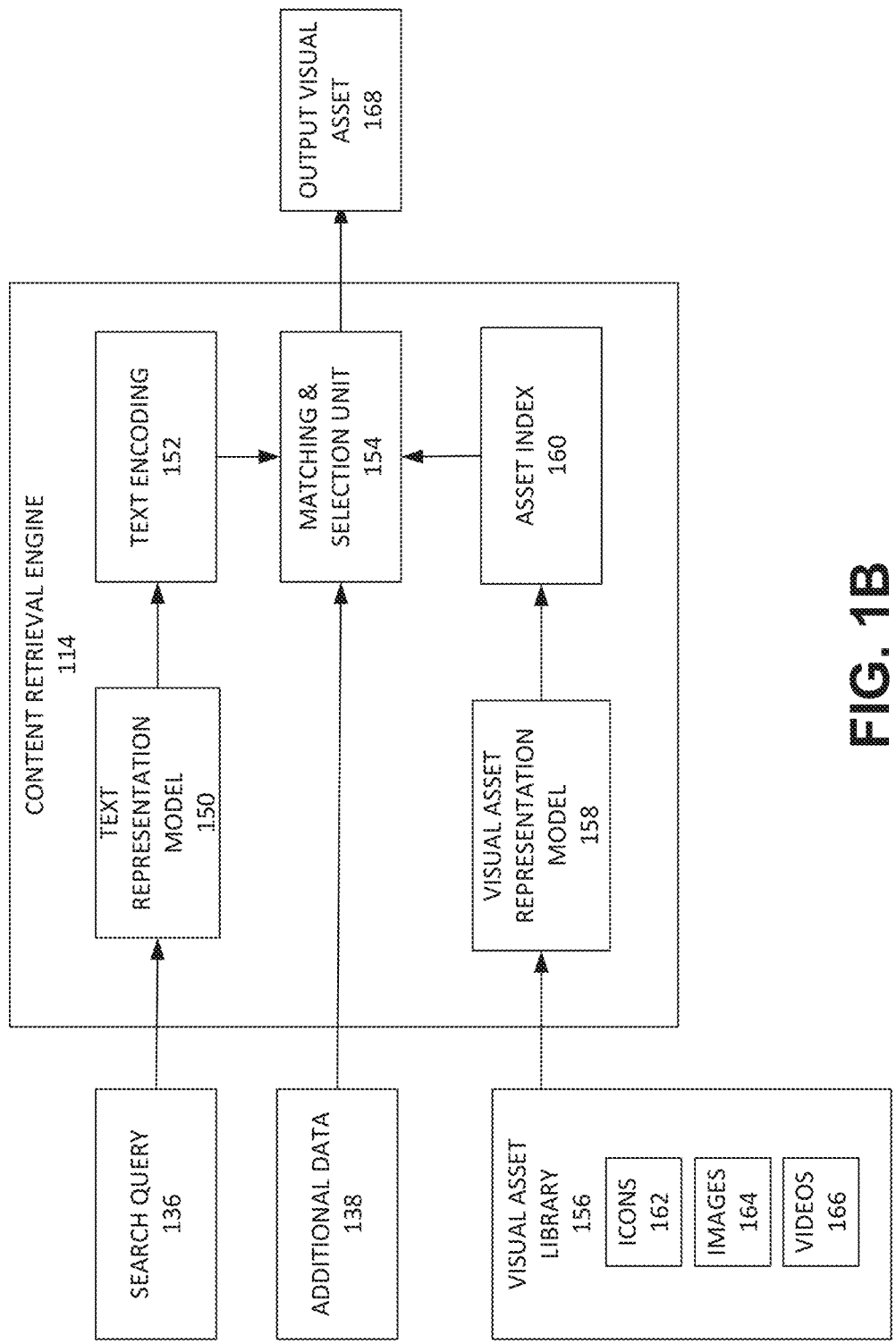
FIG. 1B depicts an example data flow between some elements of an example system upon which aspects of this disclosure may be implemented.

FIG. 1B depicts an example data flow between some of the elements of the example system 100. The content retrieval engine 114 may include a text representation model 150, a visual asset representation model 158 and a matching and selection unit 154. A search query 136 may be received via an application that provides functionality for retrieving visual assets. As discussed above, the search query 136 may be submitted by a user (e.g., explicit search request) or it may be generated by the application (e.g., implicit search request). The search query 136 may include text that specifies parameters for the desired visual assets. For example, the search query 136 may include one or more keywords or phrases related to a topic the user is interested in (e.g., waterfalls, dogs playing, plants growing, etc.).

In some implementations, the search query also includes the type of visual asset the user is interested in. For example, the search query 136 may include the phrase "videos of erupting volcanoes". To ensure such search queries are processed accurately, the application via which the search query 136 is submitted may preprocess the search query 136 by determining if the search query 136 contains keywords that indicate the search query includes a request for specific types of visual assets. In some implementations, preprocessing the search query 136 is done via one or more NLP algorithms. In some configurations, the preprocessing operations is performed by the content retrieval engine 114 or another element of the system.

Once words or phrases related to the type of visual asset desired are identified, those words or phrases may be removed from the search query 136 before the search query 136 is transmitted. The request for particular types of visual asset may then be submitted as part of the additional data 138. In some implementations, even if the search query 136 itself does not include a request for specific types of data, the application via which the request is submitted may have specific requirements or restrictions. For example, the application may only be able to process (e.g., insert) certain types of visual assets into documents. In another example, the application may have quality and/or size restrictions for visual assets that can be utilized by the application. In yet another example, the application may have threshold requirements with respect to the likelihood of the visual asset being a match for the search query 136. For example, the application may specify that only visual assets that are more likely than a predetermined threshold (e.g., above 95%) to be a match for the search query 136 should be returned. These requirements and restrictions may be included in the additional data 138 which may be transmitted from the application to the content retrieval engine 114. In some implementations, the additional data 138 is included and/or transmitted with the search query 136.

The search query 136 may be received by the text representation model 150 for processing. The text representation model 150 may be a trained ML model for encoding textual inputs into text embedding 152. The text embedding 152 may include text embedding representations such as vector embeddings. For example, the text representation model 150 may convert text into vector embeddings in a vector space. For a search query T having N words which include $T_1, T_2 \ldots T_N$, where each Tt represents a word or textual token, the search query 136 may be encoded into vector embeddings that represent the search query 136. In an example, the search query 136 is converted to a multi-dimensional vector space (e.g., 256 dimensions). The trained text representation model 150 may encode the tokens in the search query 136 in such a manner that the text embedding representations correspond to one or more visual concepts of the visual assets. In some implementations, the text representation model 150 incorporates the Turing text model. However, other text representation models may be used.

The content retrieval engine 114 may have access to a visual asset library 156. The visual asset library 156 may be stored in a storage medium such as the storage server 120 of FIG. 1A (e.g., in data store 122). Alternatively, different portions of the visual asset library 156 may be stored in different storage mediums. The visual asset library 156 may include a vast library of visual assets (e.g., thousands of visual assets), which may include many different types of visual assets. In an example, the visual asset library includes an icons library 162, an images library 164 and a videos library 166. However, many other types of visual assets may be included in the visual asset library 156 (e.g., GIFs, illustrations, emoticons, etc.). Each of the icons library 162, images library 164 and videos library 166 may include a large number visual assets.

Searching such a vast collection of visual assets that includes different types of visual assets can be complex and often requires extensive use of computer resources. That is because each time a search is submitted, one or more search systems may conduct a search of the vast library of visual assets to locate a desired asset. Furthermore, often different search systems need to be employed to search for different types of visual assets. To address these technical problems, the technical solution provided herein makes use of a visual asset representation model 158 to convert the visual assets stored in the visual asset library 156 to an asset index 160.

The visual asset representation model 158 may be a model trained to convert a visual asset into a numerical dense vector encoding. The visual asset representation model 158 may be trained such that it can index visual assets of many different types into vector encodings in the same vector space. Thus, the visual asset representation model 158 may process each of the asset libraries to convert the constituent visual assets to embedding vectors which may then be stored in a matrix/tensor format in the asset index 160 to facilitate matching and selection at runtime. In an example, the visual asset representation model 158 is a Shifted Window (SWIN) Transformer. As is known in the art, a SWIN transformer is a type of vision transformer that builds hierarchical feature maps by merging image patches in deeper layers. The visual asset representation model 158 may convert the visual assets to a multi-dimensional vector space (e.g., 256 dimensions) that has the same number of dimensions as the vector space into which the search query is converted. Thus, each visual asset in the visual asset library 156 may be encoded into a vector embedding of the asset index 160. It should be noted that while the asset index 160 is depicted as being included in the content retrieval engine 114, the asset index 160 may be stored in a storage medium accessible to the content retrieval engine 114, such as the data store 122.

The process of converting a visual asset to a vector embedding occurs once. Thus, when the visual asset representation model 158 is trained, it may process the visual asset library 156 to convert the visual assets to the asset index 160. This process does not need to be repeated in the future unless new visual assets are added to the visual asset library 156. When new assets are added to one of the icons library 162, images library 164 and videos library 166 or a new type of visual asset is added to the visual asset library 156, the new assets can be process in a zero-shot manner. This means that any new visual asset (e.g., new images, videos, etc.) can be directly converted into encodings by applying the visual asset representation model 158 to the new asset. The encodings may then be added to the indexed set of asset index 160. Thus, adding new assets to the library does not require expensive labeling of assets. Furthermore, there is no need for updating, changing, or retraining the visual asset representation model 158 or text representation model 150, when new assets area added. Still further, the process of adding new assets is an inexpensive computational operation which can occur offline. By using the visual asset representation model 158 to convert visual assets into vector encodings, the visual asset library 156 can be easily scaled to millions of assets effortlessly since no human effort is involved. As such, by utilizing the visual asset representation model 158, the technical solution significantly improves the process of adding new assets to visual asset libraries, and locating and retrieving a desired visual asset.

After a search query 136 has been received and converted into a text vector encoding, the text encoding 152 may be transmitted to the matching and selection unit 154 for processing. The matching and selection unit 154 may compare the text encoding 152 with the visual asset encodings of the asset index 160 and retrieve visual assets that are similar to the text encoding 152. To compare the text encoding 152 with the visual assets, the matching and selection unit 154 may compute similarity scores between the text encoding 152 and the visual asset encodings of the asset index 160. This may be done by using the cosine vector similarity metric to estimate the degree of similarity between a text encoding and visual asset encoding on a −1 (highly irrelevant) to a +1 (highly relevant) scale. The most highly ranked matches may then be selected as the search results. In some implementations, the matching and selection unit 154 selects visual assets whose similarity score exceeds a threshold similarity measure as the search results.

In some implementations, the matching and selection unit 154 takes the additional data 138 into account to retrieve visual assets that satisfy the requirements of the additional data 138. For example, when the additional data 138 specifies only one type of visual asset for retrieval, the matching and selection unit 154 selects search results that are of the specified type. Thus, the matching and selection unit 154 may treat the requirements set forth in the additional data 138 as tunable parameters that enable the matching and selection unit 154 to dynamically select the underlying asset index to achieve the required composition of visual assets in the retrieved results. As such, the matching and selection unit 154 may be a dynamic component that adapts to the client application requirements at runtime. Once the search results are filtered and selected, the selected visual assets may be retrieved from the visual asset library 156 and transmitted as the output visual asset 168 to the application that submitted the search query 136. In some implementations, a link to the selected visual assets is provided to the application which can in turn use the link to retrieve the visual assets.

Figure 1C:
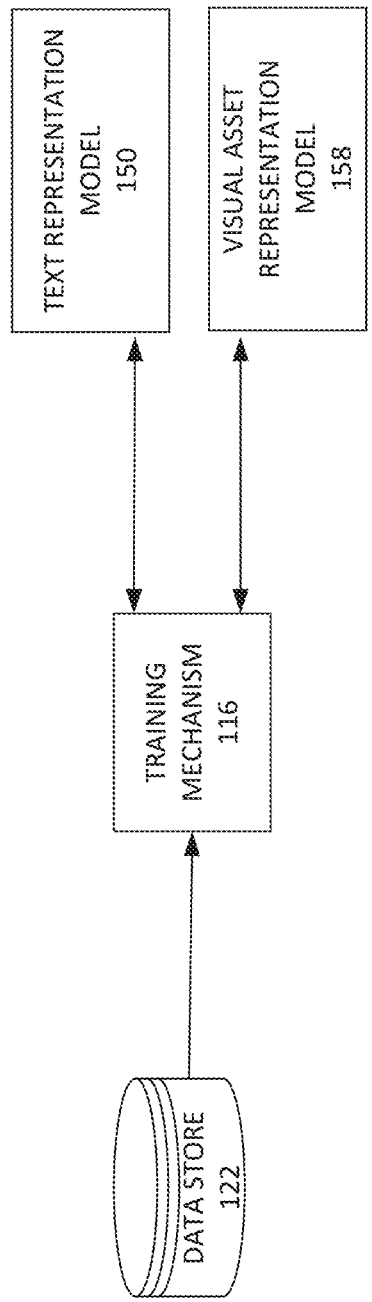
FIG. 1C how one or more ML models used by a content retrieval engine may be trained.

FIG. 1C depicts how one or more ML models used by the content retrieval engine 114 may be trained by using the training mechanism 116. The training mechanism 116 may use labeled training data sets stored in the data store 122 to provide initial and ongoing training the text representation model 150 and visual asset representation model 158. In some implementations, a training dataset which includes pairs of visual assets and their textual descriptions (e.g., one or more keywords or phrases for each visual asset) may be used to train the text representation model 150 and visual asset representation model 158 in conjunction with each other.

In some implementations, to provide ongoing training, the training mechanism 144 may use training data sets received from each of the ML models. Furthermore, data may be provided from the training mechanism 116 to the data store 122 to update one or more of the training datasets in order to provide updated and ongoing training. Additionally, the training mechanism 122 may receive training data such as knowledge from other pre-trained mechanisms.

Figure 2:
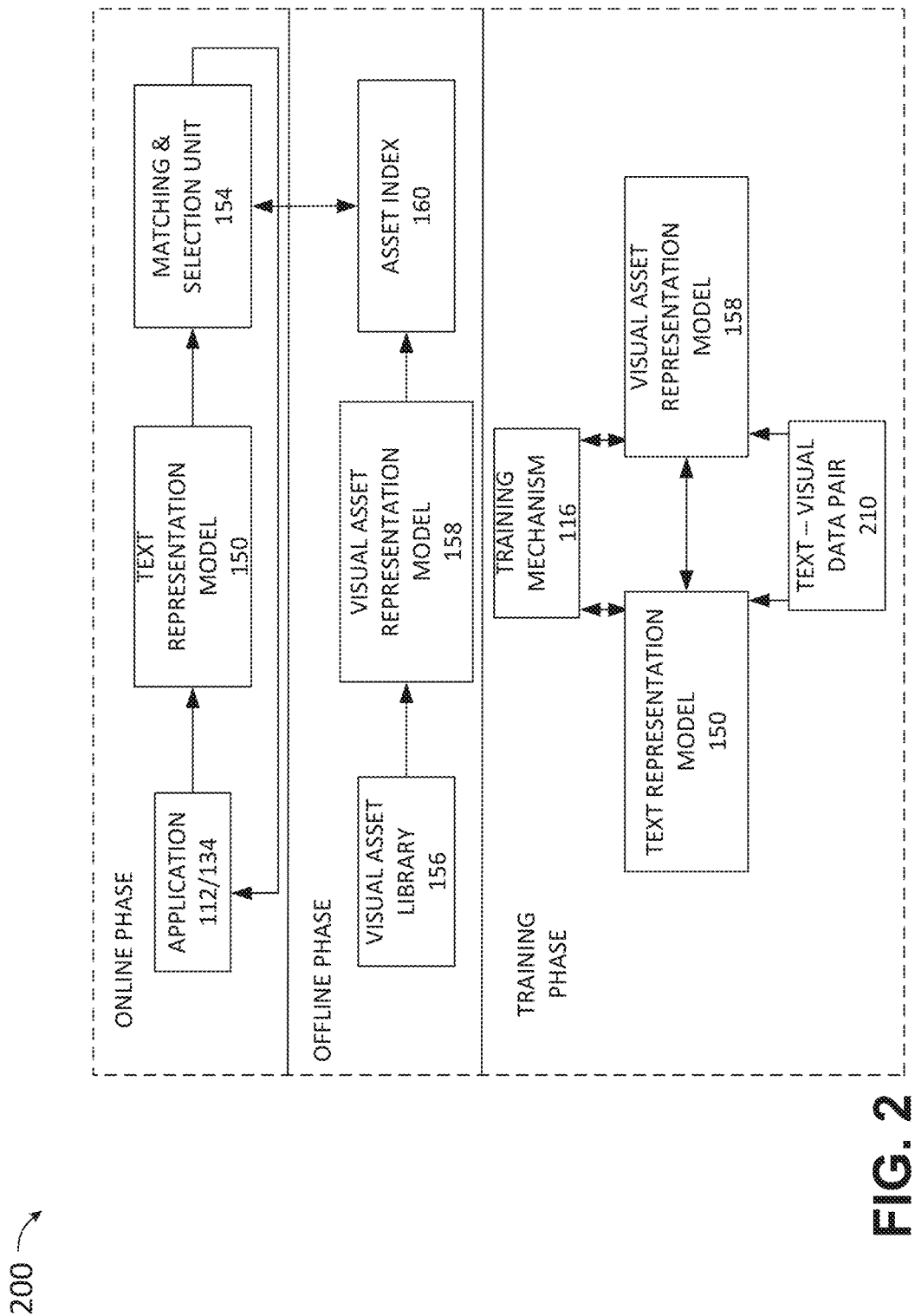
FIG. 2 depicts is an example model architecture for training and utilizing a visual content retrieval system.

FIG. 2 depicts is an example model architecture 200 for training and utilizing a visual content retrieval system. The model architecture 200 may include three phases: a training phase, a an offline phase and an online phase. The training phase may involve training each of the text representation model 150 and visual asset representation model 158 with training data that includes text-visual data pairs 210. The text-visual data pairs 210 may include visual assets that are aligned with text descriptions or phrases. For example, a picture of a parrot on a tree may be paired with the text "parrot in the wild." In an example, the text representation model 150 and visual asset representation model 158 are trained in conjunction with each other with a vast number (e.g., millions) of text-visual data pairs 210. The text-visual data pairs 210 may include diverse types of visual assets to represent the asset libraries that are used for retrieval of visual assets in the online retrieval phase. This enables the visual asset representation model 158 to identify associations between visual objects and words and learn how to encode visual assets into vector embeddings that are similar to vector embeddings generated by the text representation model 150. Thus, during the training phase, the visual asset representation model 158 is trained to encode generic knowledge of semantic concepts, patterns and objects that commonly appear in visual assets. Analogously, the text representation model 150 is trained to map words and tokens in input textual sequences to the visual concepts of the visual training data.

The offline phase involves use of the trained visual asset representation model 158 to process each of the asset libraries in the visual asset library 156 to convert the constituent visual assets to embedding vectors, which are then stored in the asset index 160. The online phase, on the other hand, includes receiving textual inputs for a search query from an application 112/134, and using the trained text representation model 150 to encode the textual input into embedding representations that are provided to the matching and selection unit 154. The matching and selection unit 154 may then compare the text embedding representations with the asset index generated by the visual asset representation model 158 to identify search results.

In some implementations, when the application 112 imposes specific latency requirements, distillation techniques may be used to develop an efficient low-latency replica of the pre-trained text representation model 150. This replica may replicate the pre-trained text representation model 150 with high-fidelity while only consuming a small fraction of the memory and latency budgets utilized by the text representation model 150. This enables the content retrieval system to operate at a low latency and efficient manner.

The modular construction of model architecture 200, both in terms of separate computation and different phases of training, indexing and online usage, provides significant advantages for operating, analyzing, maintaining, and periodically updating the underlying models. For example, the selection and matching unit 154 may be independently updated to incorporate new client application constraints. This can occur independent of the vision and text modules, thus providing an efficient mechanism for maintaining and updating the system.

Figure 3A:
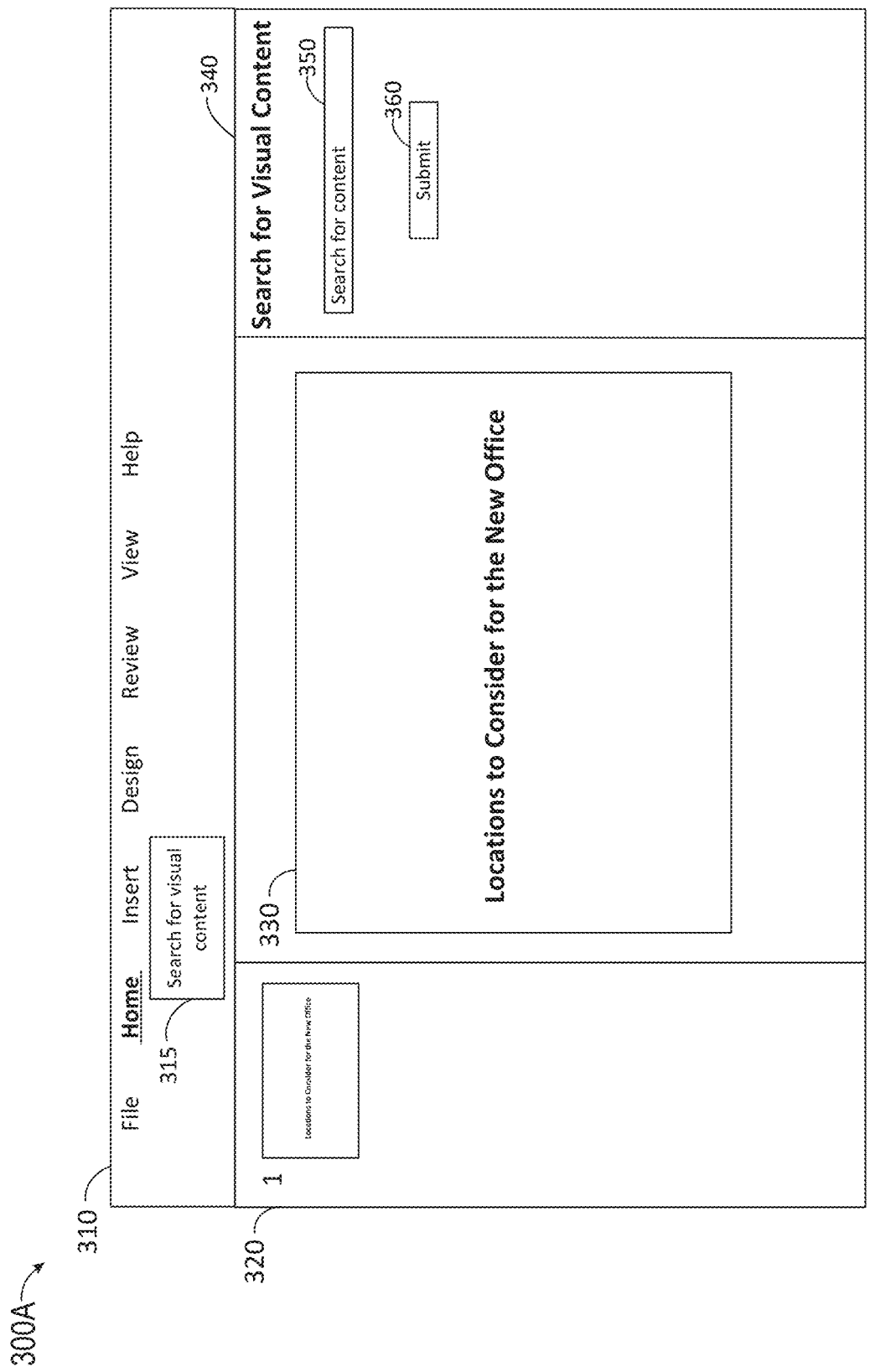
Figure 3B:
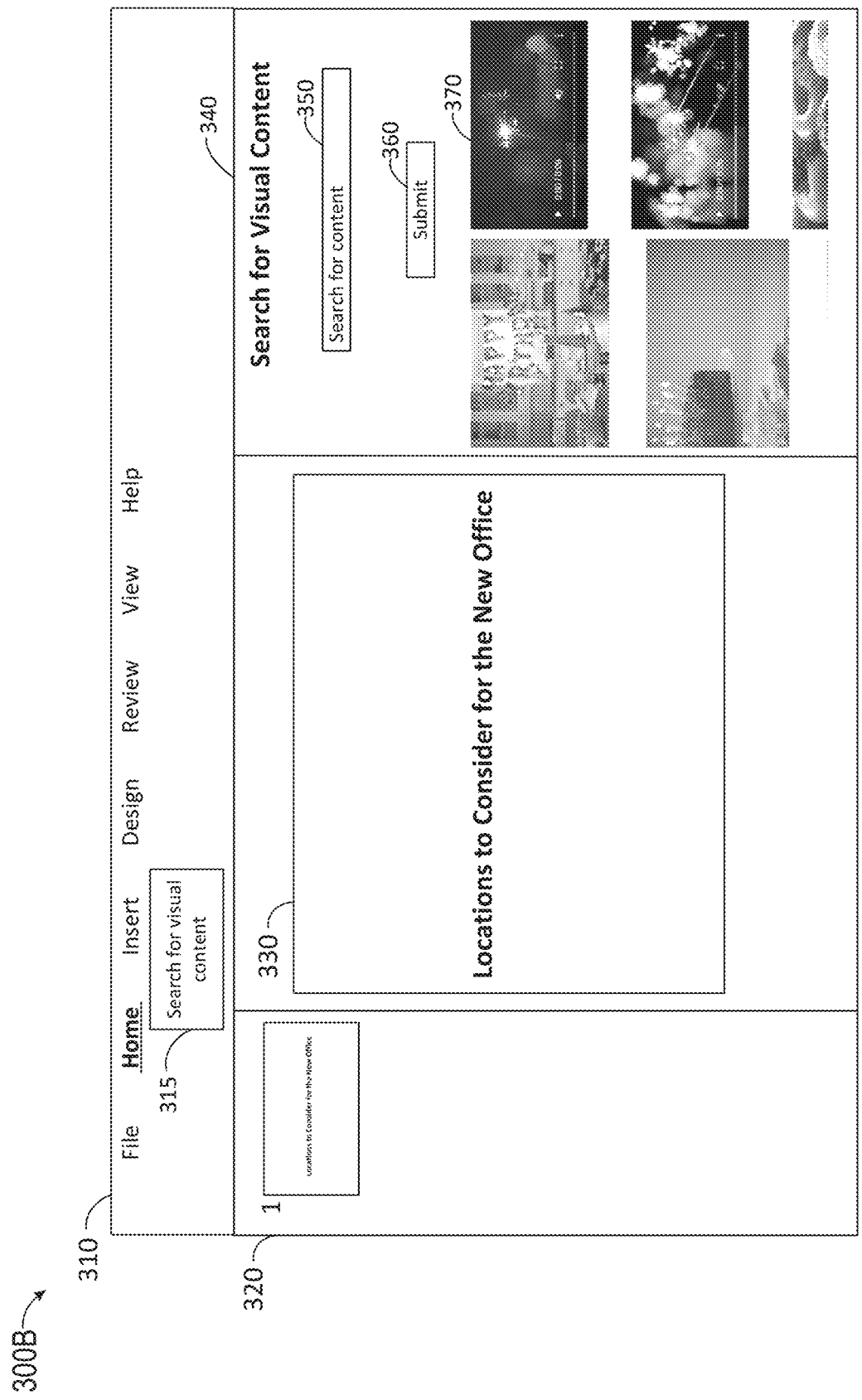

FIGS. 3A-3B depict an example GUI screens of an application or service that provides visual content retrieval capabilities. FIG. 3A depicts an example GUI screen 300A of a presentation application (e.g., Microsoft PowerPoint®) displaying an example document. GUI screen 300A may include a toolbar menu 310 containing various menu options for performing various tasks in the application. For example, the toolbar menu 310 may provide options for the user to perform one or more tasks to create or edit the document. GUI screen 300A may also contain a thumbnail pane 320 for displaying a thumbnail for each of the slides in the document and a content pane 330 for displaying the content of the document (e.g. displaying the slides one slide at a time). The content may be displayed to the user for viewing and/or editing purposes and may be created by the user. For example, the user may utilize an input device (e.g., a keyboard) to insert input such as text as well as visual content such as images, icons, emoticons, and the like into the content pane 330.

As the user creates or edits the content of the content pane 330, a UI element may be provided for transmitting a request to search for visual content that can be inserted into the document. The UI element may be any menu option that can be used to indicate a request by the user. In one implementation, the UI element is provided via a menu option such as the menu button 315 in the toolbar menu 310. When the user utilizes an input/output device such as a mouse to click on the menu button 315, this may result in the display of the search for visual content pane 340. Alternatively, upon selecting the toolbar menu 310, a search box such as the search input box 350 may be displayed over the content pane 330 or elsewhere on the GUI screen 300A.

The search input box 350 may be utilized to input a search query for conducting a search of available visual assets. Once the user enters a search query into the input box 350, they may utilize the UI element 360 to submit the search request. The application may then utilize a local content retrieval engine or transmit a request to a global content retrieval engine to search for the requested visual assets. The search may be performed, as discussed above, and the search results may be provided to the application.

Once the results are received, the application may display the search results in a GUI screen such as the GUI screen 300B of FIG. 3B. The search results 370 may be displayed in the visual content pane 340. As depicted, the search results 370 may include images and videos. Other types of video assets may also be provided as search results. In some implementations, the visual content pane 340 may provide a dropdown menu or other type of UI element for selecting the types of visual assets desired. In some implementations, the search results 370 are displayed within a pop-menu that appears over the GUI screen 300B.

One or more of the search results 370 may be selected by clicking on the desired search result. Upon selection, the selected search result may automatically be inserted in the content pane 330. It should be noted that while GUI screens 300A-300B, include a search input box 350, in some implementations, search results 370 are provided automatically as recommendations without an explicit user request.

Figure 4:
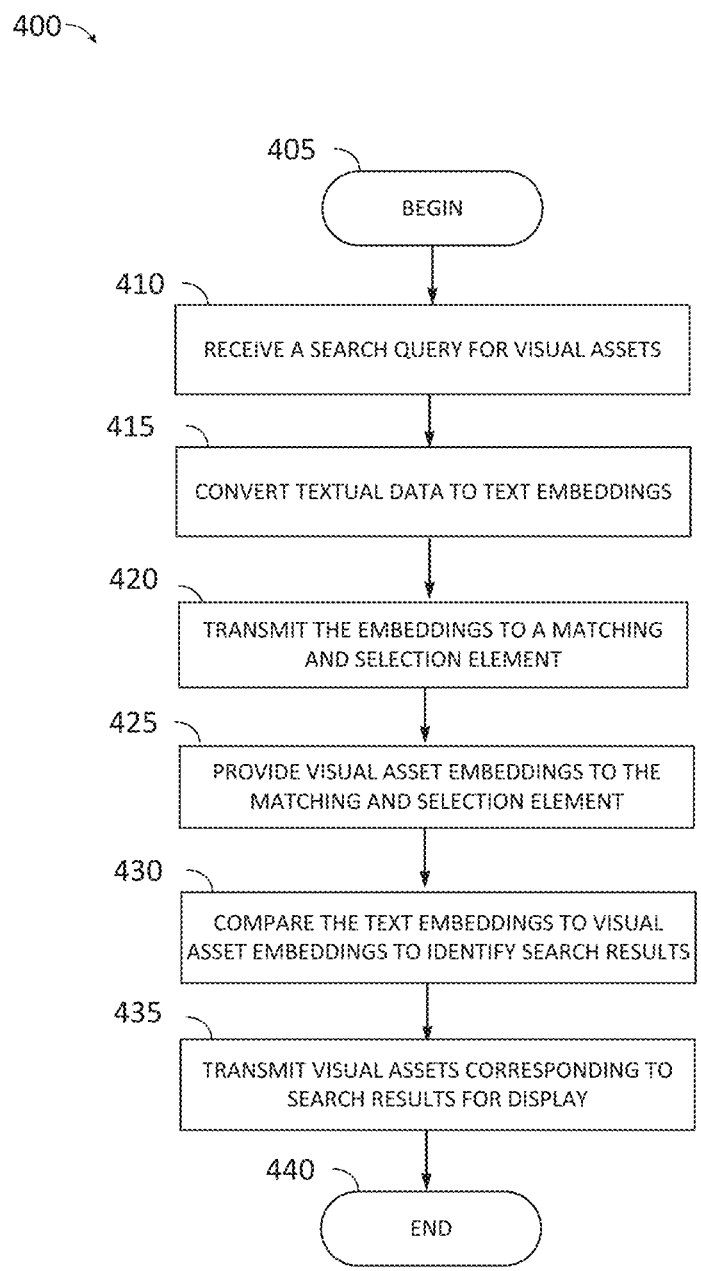
FIG. 4 is a flow diagram depicting an example method for intelligently retrieving visual assets.

FIG. 4 is a flow diagram depicting an exemplary method 400 for intelligently retrieving visual assets. One or more steps of the method 400 may be performed by a content retrieval engine such as the content retrieval engine 114 of FIGS. 1A-1B or by an application such as applications 112/134 of FIGS. 1A-1B. The method 400 may begin, at 405, and proceed to receive a search query for visual assets, at 410. This may occur, for example, when a user submits a textual input via a UI of an application or service that provides visual content retrieval. The input may include one or more keywords, may be provided via a client device and may then be transmitted via a network to a content retrieval engine.

Once a search query is received, the textual data within the search query may be converted into text embedding representations, at 415. This may be done by utilizing a trained text representation ML model that converts the textual data into embeddings. The embeddings may then be transmitted to a matching and selection unit, at 420. Visual asset embeddings that have previously been generated from visual assets may then be provided to the matching and selection element, at 425.

The matching and selection element may then compare the text embeddings to the visual asset embeddings to identify search results that correspond to the search query, at 430. In some implementations, this involves computing a similarity score between the text embeddings and the visual asset embeddings and selecting a plurality of visual assets having top similarity as the search results. In an example, visual assets having similarity scores that are higher than a given threshold are selected as the results. The identified search results may then be transmitted for display to the application from which the search query was received, at 435, before method 400 ends, at 440.

Figure 5:
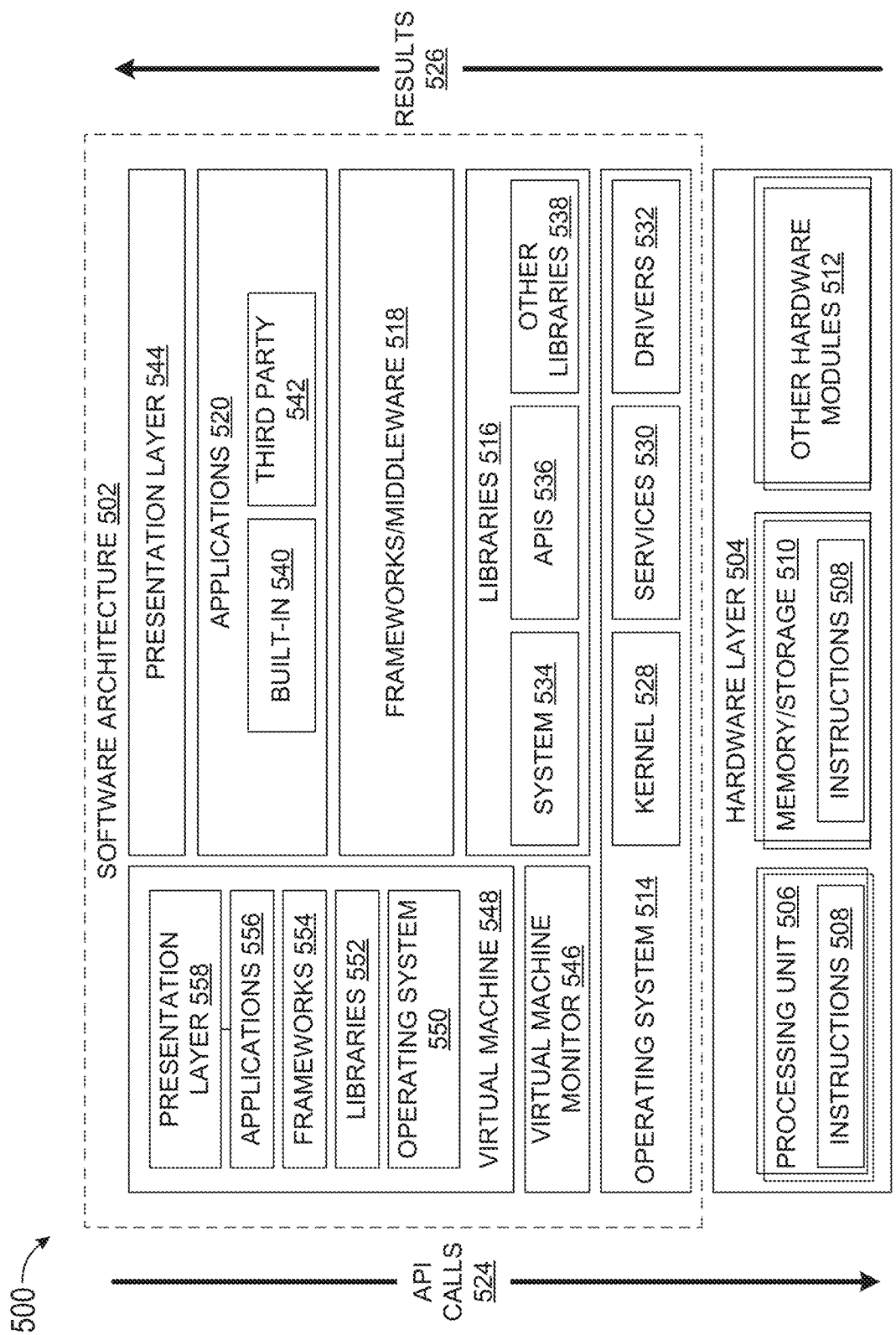
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
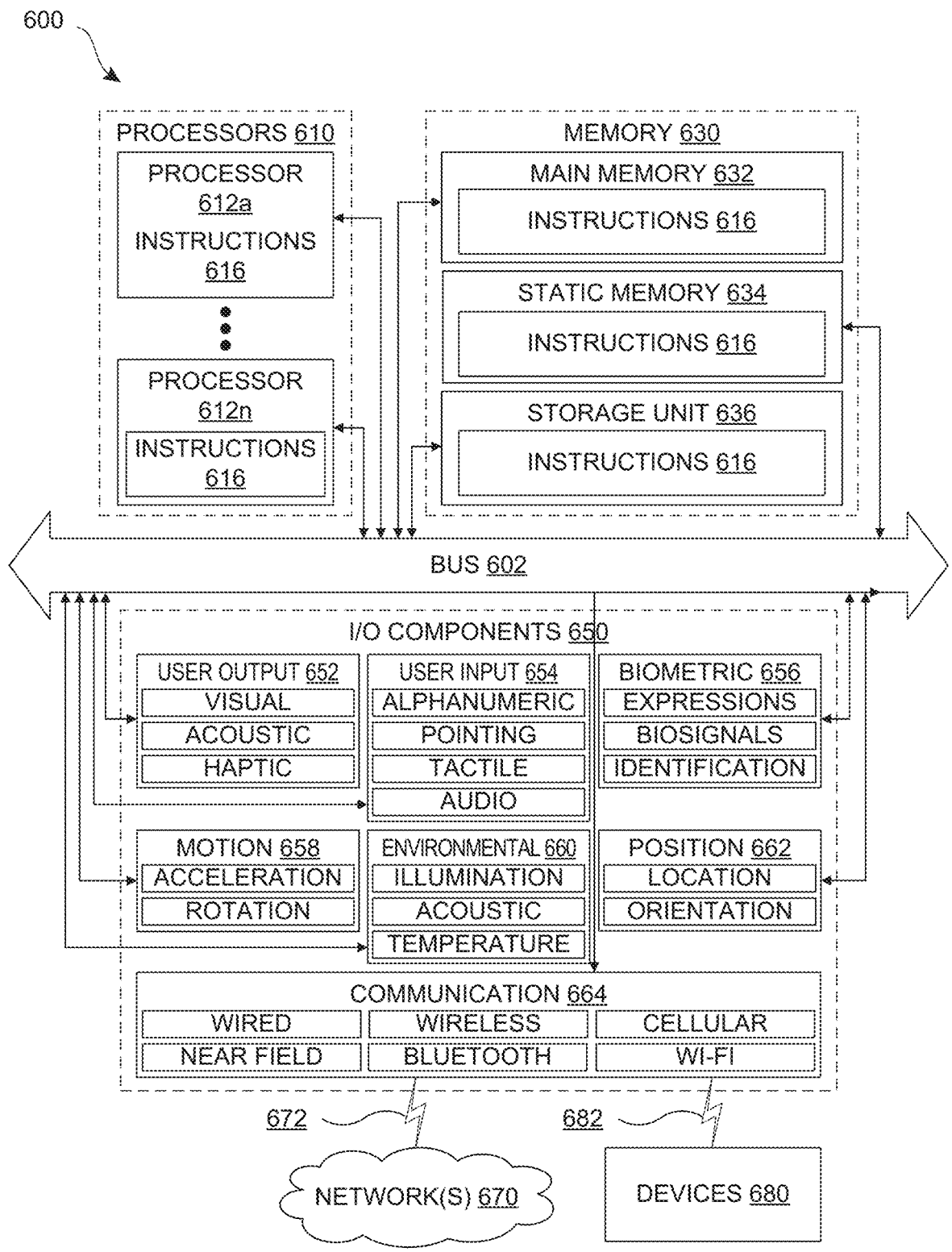
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by, the processor, cause the data processing system to perform functions of:
receiving a search query for one or more visual assets, the search query including textual data;
encoding the textual data into one or more text embedding representations via a trained text representation machine-learning (ML) model;
transmitting the one or more text embedding representations to a matching and selection unit;
providing visual embedding representations of one or more visual assets to the matching and selection unit;
comparing, by the matching and selection unit, the one or more text embedding representations to the visual embedding representations to identify one or more visual asset search results; and
providing the one or more visual asset search results for display.

Item 2. The data processing system of item 1, wherein the visual assets include at least one of an image, a video, an icon, a GIF, an illustration, and an emoticon.

Item 3. The data processing system of items 1 or 2, wherein the visual assets are stored in a visual asset library.

Item 4. The data processing system of any preceding item, wherein the executable instructions, when executed by the processor, further cause the data processing system to perform functions of:
providing the one or more visual assets as input to a trained visual asset representation ML model; and
receiving the visual embedding representations as an output from the visual asset representation ML model.

Item 5. The data processing system of item 4, wherein the trained text representation ML model and the trained visual asset representation ML are trained using training data that includes aligned text-visual asset data pairs.

Item 6. The data processing system of item 4, wherein the executable instructions, when executed by the processor, further cause the data processing system to perform functions of:
receiving new visual assets;
providing the new visual assets to the trained visual asset representation ML model;
receiving new visual embedding representations for the new visual assets as the output from the visual asset representation ML model; and
storing the new visual embedding representations in a visual asset index.

Item 7. The data processing system of any preceding item, wherein the visual embedding representations are stored in a visual asset index.

Item 8. A method for retrieving one or more visual assets comprising:
receiving a search query for the one or more visual assets, the search query including textual data;
encoding the textual data into one or more text embedding representations via a trained text representation machine-learning (ML) model;
transmitting the one or more text embedding representations to a matching and selection unit;
providing visual embedding representations of one or more visual assets to the matching and selection unit;
comparing, by the matching and selection unit, the one or more text embedding representations to the visual embedding representations to identify one or more visual asset search results; and
providing the one or more visual asset search results for display.

Item 9. The method of item 8, wherein the visual assets include at least one of an image, a video, an icon, a GIF, an illustration, and an emoticon.

Item 10. The method of items 8 or 9, wherein the visual assets are stored in a visual asset library.

Item 11. The method of any of items 8-10, further comprising:
providing the one or more visual assets as input to a trained visual asset representation ML model; and
receiving the visual embedding representations as an output from the visual asset representation ML model.

Item 12. The method of item 11, wherein the trained text representation ML model and the trained visual asset representation ML are trained using training data that includes aligned text-visual asset data pairs.

Item 13. The method of item 11, further comprising:
receiving new visual assets;

providing the new visual assets to the trained visual asset representation ML model;
receiving new visual embedding representations for the new visual assets as the output from the visual asset representation ML model; and
storing the new visual embedding representations in a visual asset index.

Item 14. The method of any of items 8-13, wherein the visual embedding representations are stored in a visual asset index.

Item 15. A non-transitory computer readable medium on which are stored instructions that, when executed, cause a programmable device to perform functions of:
receiving a search query for one or more visual assets, the search query including textual data;
encoding the textual data into one or more text embedding representations via a trained text representation machine-learning (ML) model;
transmitting the one or more text embedding representations to a matching and selection unit;
providing visual embedding representations of one or more visual assets to the matching and selection unit;
comparing, by the matching and selection unit, the one or more text embedding representations to the visual embedding representations to identify one or more visual asset search results; and
providing the one or more visual asset search results for display.

Item 16. The non-transitory computer readable medium of item 15, wherein the visual assets include at least one of an image, a video, an icon, a GIF, an illustration, and an emoticon.

Item 17. The non-transitory computer readable medium of items 15 or 16, wherein the instructions when executed, further cause a programmable device to perform functions of:
providing the one or more visual assets as input to a trained visual asset representation ML model; and
receiving the visual embedding representations as an output from the visual asset representation ML model.

Item 18. The non-transitory computer readable medium of item 17, wherein the trained text representation ML model and the trained visual asset representation ML are trained using training data that includes aligned text-visual asset data pairs.

Item 19. The non-transitory computer readable medium of item 17, wherein the instructions when executed, further cause a programmable device to perform functions of:
receiving new visual assets;
providing the new visual assets to the trained visual asset representation ML model;
receiving new visual embedding representations for the new visual assets as the output from the visual asset representation ML model; and
storing the new visual embedding representations in a visual asset index.

Item 20. The non-transitory computer readable medium of any of items 15-19, wherein the visual embedding representations are stored in a visual asset index.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:

receiving a search query for one or more visual assets, the search query including textual data;
encoding the textual data into one or more text embedding representations via a trained text representation machine-learning (ML) model;
transmitting the one or more text embedding representations to a matching and selection unit;
providing visual embedding representations of one or more visual assets to the matching and selection unit;
comparing, by the matching and selection unit, the one or more text embedding representations to the visual embedding representations to identify one or more visual asset search results; and
providing the one or more visual asset search results for display,
wherein:
the one or more visual assets are stored in a visual asset library, and
new visual assets are added to the visual asset library by:
receiving the new visual assets;
providing the new visual assets to a trained visual asset representation ML model;
receiving new visual embedding representations for the new visual assets from the visual asset representation ML model;
storing the new visual embedding representations in a visual asset index associated with the visual asset library,
the trained text representation ML model and the trained visual asset representation ML model are trained in conjunction with each other using a training dataset which includes pairs of visual assets and their textual descriptions, their textual descriptions including one or more keywords for each visual asset in the pairs of visual assets and their textual descriptions, and
the trained text representation ML model and the trained visual asset representation ML model are trained using one or more pre-trained mechanisms.

2. The data processing system of claim 1, wherein the visual assets include at least one of an image, a video, an icon, a GIF, an illustration, and an emoticon.

3. The data processing system of claim 1, wherein the visual embedding representations are stored in a visual asset index.

4. The data processing system of claim 1, wherein the search query is received via a user interface of an application that provides text searching to perform a search of visual content.

5. The data processing system of claim 1, wherein the training dataset is updated, and the updated training dataset is used to update at least one of the trained text representation ML model and the trained visual asset representation ML model.

6. The data processing system of claim 1, wherein the trained visual asset representation ML model is trained to encode generic knowledge of at least one of semantic concepts, patterns or objects that appear in visual assets.

7. A computer implemented method for retrieving one or more visual assets comprising:
receiving a search query for the one or more visual assets, the search query including textual data;
encoding the textual data into one or more text embedding representations via a trained text representation machine-learning (ML) model;
transmitting the one or more text embedding representations to a matching and selection unit;
providing visual embedding representations of one or more visual assets to the matching and selection unit;
comparing, by the matching and selection unit, the one or more text embedding representations to the visual embedding representations to identify one or more visual asset search results; and
providing the one or more visual asset search results for display,
wherein:
the one or more visual assets are stored in a visual asset library, and
new visual assets are added to the visual asset library by:
receiving the new visual assets;
providing the new visual assets to a trained visual asset representation ML model;
receiving new visual embedding representations for the new visual assets from the visual asset representation ML model;
storing the new visual embedding representations in a visual asset index associated with the visual asset library,
the trained text representation ML model and the trained visual asset representation ML model are trained in conjunction with each other using a training dataset which includes pairs of visual assets and their textual descriptions, their textual descriptions including one or more keywords for each visual asset in the pairs of visual assets and their textual descriptions, and
the trained text representation ML model and the trained visual asset representation ML model are trained using one or more pre-trained mechanisms.

8. The computer implemented method of claim 7, wherein the visual assets include at least one of an image, a video, an icon, a GIF, an illustration, and an emoticon.

9. The computer implemented method of claim 7, wherein the visual embedding representations are stored in a visual asset index.

10. A non-transitory computer readable medium on which are stored instructions that, when executed, cause a programmable device to perform functions of:
receiving a search query for one or more visual assets, the search query including textual data;
encoding the textual data into one or more text embedding representations via a trained text representation machine-learning (ML) model;
transmitting the one or more text embedding representations to a matching and selection unit;
providing visual embedding representations of one or more visual assets to the matching and selection unit;
comparing, by the matching and selection unit, the one or more text embedding representations to the visual embedding representations to identify one or more visual asset search results; and
providing the one or more visual asset search results for display,
wherein:
the one or more visual assets are stored in a visual asset library, and
new visual assets are added to the visual asset library by:
receiving the new visual assets;

providing the new visual assets to a trained visual asset representation ML model;

receiving new visual embedding representations for the new visual assets from the visual asset representation ML model;

storing the new visual embedding representations in a visual asset index associated with the visual asset library, the trained text representation ML model and the trained visual asset representation ML model are trained in conjunction with each other using a training dataset which includes pairs of visual assets and their textual descriptions, their textual descriptions including one or more keywords for each visual asset in the pairs of visual assets and their textual descriptions, and the trained text representation ML model and the trained visual asset representation ML model are trained using a pre-trained mechanism.

11. The non-transitory computer readable medium of claim 10, wherein the visual assets include at least one of an image, a video, an icon, a GIF, an illustration, and an emoticon.

12. The non-transitory computer readable medium of claim 10, wherein the visual embedding representations are stored in a visual asset index.

* * * * *